US008493082B2

(12) United States Patent
Jeong

(10) Patent No.: US 8,493,082 B2
(45) Date of Patent: Jul. 23, 2013

(54) SEATING SENSING DEVICE AND METHOD OF THE SAME

(75) Inventor: Ji Wook Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 334 days.

(21) Appl. No.: 12/882,455

(22) Filed: Sep. 15, 2010

(65) Prior Publication Data

US 2011/0140723 A1 Jun. 16, 2011

(30) Foreign Application Priority Data

Dec. 10, 2009 (KR) ........................ 10-2009-0122631

(51) Int. Cl.
*G01R 27/08* (2006.01)
(52) U.S. Cl.
USPC ........... 324/705; 324/605; 324/606; 324/691; 324/525; 324/658; 73/862.632; 73/862.637; 280/734; 280/735
(58) Field of Classification Search
USPC ................. 324/705, 605–607, 691, 176, 525; 324/658; 280/734, 735; 73/862.632, 862.637, 73/632.046
See application file for complete search history.

(56) References Cited

U.S. PATENT DOCUMENTS

| 5,232,243 | A  | * | 8/1993  | Blackburn et al. ............ 280/732 |
| 5,474,327 | A  | * | 12/1995 | Schousek ...................... 280/735 |
| 5,732,375 | A  | * | 3/1998  | Cashler ........................... 701/45 |
| 6,345,839 | B1 | * | 2/2002  | Kuboki et al. ................ 280/735 |
| 6,737,953 | B2 |   | 5/2004  | Serban et al. |
| 7,542,836 | B1 | * | 6/2009  | Norton ............................ 701/45 |
| 8,161,826 | B1 | * | 4/2012  | Taylor ...................... 73/862.044 |
| 2005/0011738 | A1 | * | 1/2005  | Smith et al. ................. 200/85 R |
| 2005/0167959 | A1 | * | 8/2005  | Speckhart et al. ............ 280/735 |
| 2005/0282009 | A1 |   | 12/2005 | Nusko et al. |
| 2006/0107762 | A1 | * | 5/2006  | Sandbach et al. .......... 73/862.68 |
| 2007/0050199 | A1 |   | 3/2007  | Ishibashi et al. |
| 2007/0210074 | A1 |   | 9/2007  | Maurer et al. |
| 2008/0017625 | A1 |   | 1/2008  | Ito et al. |
| 2008/0300503 | A1 |   | 12/2008 | Lee et al. |
| 2009/0128168 | A1 | * | 5/2009  | Qi et al. ........................ 324/693 |
| 2010/0101858 | A1 | * | 4/2010  | Kato et al. ................... 174/84 R |
| 2010/0141576 | A1 | * | 6/2010  | Jeong et al. ................... 345/157 |

FOREIGN PATENT DOCUMENTS

| JP | 2002-214029 A | 7/2002 |
| JP | 2004-151974 A | 5/2004 |
| JP | 2005-206011 A | 8/2005 |
| JP | 2005-538270 A | 12/2005 |
| JP | 2007-227384 A | 9/2007 |
| JP | 2008-024087 A | 2/2008 |
| KR | 10-2004-0079700 A | 9/2004 |
| KR | 10-2008-0106669 A | 12/2008 |

* cited by examiner

*Primary Examiner* — Arleen M Vazquez
*Assistant Examiner* — Thang Le

(57) ABSTRACT

A seating sensing device embedded in a seat includes: a variable resistance unit generating resistance values corresponding to the circumference of the seat through a plurality of conductive threads installed in the seat; and a signal analysis unit analyzing variable quantities of the resistance values to acquire activity information on one or more of whether a user is seated or not, a seating posture, and a seating posture change.

18 Claims, 6 Drawing Sheets

SEATING SENSING DEVICE AND METHOD OF THE SAME

CROSS-REFERENCE TO RELATED APPLICATIONS

This application claims the priority of Korean Patent Application No. 2009-0122631 filed on Dec. 10, 2009, in the Korean Intellectual Property Office, the disclosure of which is incorporated herein by reference.

BACKGROUND OF THE INVENTION

1. Field of the Invention

The present invention relates to a seating sensing device and method, and more particularly, to a seating sensing device embedded in a seat, which derives activity information such as whether a user is seated or not, by using conductive threads installed in the seat, and a seating confirmation method.

2. Description of the Related Art

In a seating sensing method according to the related art, when information relating to whether or not a user is seated on a seat, or activity information such as statistics of seating states and seating activities in a vehicle or conference hall is to be collected, a sensor such as a piezoelectric element inserted into the bottom surface of a seat is used to collect piezoelectric signals which are generated by a weight applied when the user is seated on the seat.

In the case of the vehicle, a seating sensing method confirms whether a driver is seated on a seat or not by using a device for sensing whether a safety belt is in use or not.

In such a method, however, a separate sensor device such as a piezoelectric sensor should be embedded in an existing seating sensing device, and the position of the sensor should be selected through a complicated procedure such that sufficient pressure may be transmitted to the sensor.

SUMMARY OF THE INVENTION

An aspect of the present invention provides a seating sensing device which is installed in a seat having conductive threads embedded therein so as to easily and effectively derive activity information regarding whether a user is seated on the seat or not, and a seating sensing method.

According to an aspect of the present invention, there is provided a seating sensing device embedded in a seat. The seating configuration device includes: a variable resistance unit generating resistance values corresponding to the circumference of the seat through a plurality of conductive threads installed in the seat; and a signal analysis unit analyzing variable quantities of the resistance values to acquire activity information on one or more of whether a user is seated or not, a seating posture, and a seating posture change.

Each of the conductive threads may include: an electroconductive fiber generating a resistance value corresponding to the length thereof; and an elastic thread having elasticity. Each of the conductive threads may be implemented in such a shape that the electroconductive fiber and the elastic thread are twisted about each other. The plurality of conductive threads may be disposed at even intervals from each other.

The variable resistance unit may be installed as a cushion type on a seat board, installed as a patch type so as to be attached to or detached from the seat surface, installed as an embedded type so as to be embedded in the seat, or installed as a sheet type so as to cover the entire surface of the seat.

The signal analysis unit may include: a resistance-voltage converter converting the resistance values into voltage values, respectively; and an activity information generator analyzing patterns of change in the voltage values to acquire the activity information on one or more of whether a user is seated or not, a seating posture, and a seating posture change.

When a voltage value having a larger variable quantity than a seating detection reference exists, the activity information generator may generate and output activity information reporting that the user is seated. The activity information generator may determine seat regions in which the voltage values are increased to be greater than before, derive the seating posture of the user, and generate and output activity information reporting the derived seating posture. The activity information generator may determine patterns of change in seat regions in which the voltage values are increased to be greater than before, confirm whether the seating posture of the user is changed or not, and generate and output activity information reporting that the seating posture has been changed.

The resistance-voltage converter may include one or more voltage division circuits having one or more of the plurality of conductive threads as variable resistors and dividing voltages depending on the resistance values of the variable resistors.

The signal analysis unit may further include a signal converter performing analog-digital conversion on the respective voltage values to convert the respective voltage values into digitized voltage values and providing the digitized voltage values to the activity information generator.

The seating sensing device may further include: a display unit generating a character, an image, and a sound corresponding to the activity information and outputting the generated character, image, and sound to a monitor and a speaker which are embedded in the seat; and a transmission unit providing the activity information to an external device.

According to another aspect of the present invention, there is provided a seating sensing method including: generating resistance values corresponding to the circumference of a seat through a plurality of conductive threads installed therein; converting the resistance values into voltage values, respectively; performing analog-digital conversion on the voltage values to convert the voltage values into digitized voltage values, respectively; and analyzing the digitized voltage values to acquire the activity information on one or more of whether a user is seated or not, a seating posture, and a seating posture change.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
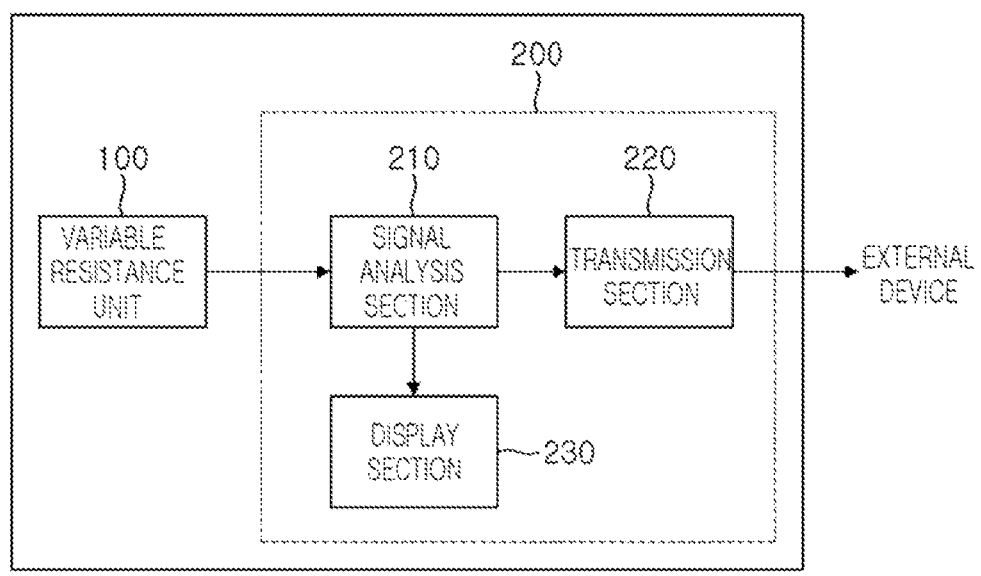
FIG. 1 is a block diagram illustrating a seating sensing device embedded in a seat according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Furthermore, when it is described that one component 'includes' another component, it means that the one component does not exclude yet another component, but may include yet another component.

FIG. 1 is a block diagram illustrating a seating sensing device embedded in a seat according to an embodiment of the present invention.

Referring to FIG. 1, the seating sensing device embedded in a seat according to the embodiment of the present invention includes a variable resistance unit 100 and a signal processing unit 200 which are installed in the seat. The signal processing unit 200 may include a signal analysis section 210, a transmission section 220, and a display section 230. In this case, the seat may include all kinds of structures having a seat form, such as a conference-hall chair and a vehicle chair, on which a user may be seated.

The variable resistance unit 100 includes a plurality of conductive threads, each of which generates a resistance value corresponding to the circumference of the seat which is varied depending on whether a person is seated or not, a seating posture, and a seating posture change. That is, when a user is seated on the seat or changes seating posture, the circumference of the seat may be varied. In this case, the variable resistance unit 100 detects the variations and generates resistance values corresponding to the variations.

Referring to FIGS. 2A to 2D, the variable resistance unit 100 of FIG. 1 may be installed as a cushion type on a seat board, installed as a patch type so as to be attached to and detached from the seat, installed as an embedded type so as to be embedded in the seat, or installed as a sheet type so as to cover the entire surface of the seat.

Figure 3:
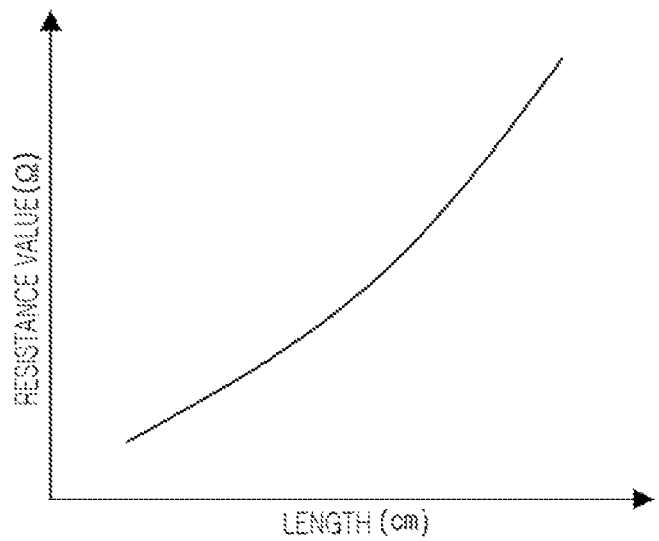
FIG. 3 is a graph showing an electrical characteristic of conductive threads according to the embodiment of the present invention.

Referring to FIG. 3, the respective conductive threads have an electrical characteristic such that their resistance value linearly increases in proportion to their length. Each of the conductive threads includes an electroconductive fiber generating a resistance value proportional to the length thereof and an elastic thread having elasticity, and may be implemented in such a manner that the electroconductive fiber and the elastic thread are twisted about each other. For example, an electroconductive fiber may be twisted around an elastic thread, or a pair of electroconductive fibers may be twisted around an elastic thread in opposite directions.

The signal analysis section 210 analyzes patterns of change in the resistance values generated by the plurality of the conductive threads and derives activity information on one or more of whether the user is seated or not, seating posture, and a seating posture change. Specifically, a conversion formula may be applied to calculate the variation in the outer circumference of the seat on which the user is seated, from variable quantities of the resistance values generated by the plurality of conductive threads.

For example, when the user is seated on the seating sensing device and moves restlessly for a predetermined time, the outer circumference of the seat is increased in comparison to when the seat is empty. When a difference in the length or resistance value of the conductive threads between when the user is seated and when the seat is empty is calculated, it is possible to derive information as to whether the user is seated or not. That is, when a voltage value having a variable quantity larger than a seating detection reference exists, the signal analysis section 210 generates and outputs activity information reporting that the user has been seated on the seat.

The signal analysis section 210 may determine the resistance values of the conductive threads for each portion of the seat, and confirm and report the current seating posture of the user on the basis of the resistance values. That is, when only the resistance values of the conductive threads disposed in the seat board and a left armrest of the seat increase to be greater than before, the signal analysis section 210 may confirm and report that the user has put his/her arm on the left armrest.

Furthermore, the signal analysis section 210 may sense and report a change in the seating posture of the user through the patterns of change in the resistance values of the conductive threads. For example, when the resistance values of the conductive threads disposed in the seat board and a right armrest of the seat increase in a state in which the resistance values of the conductive threads disposed in the seat board and the left armrest of the seat have increased, the signal analysis section 210 may sense and report that the user has changed seating posture from the state in which the user puts his/her arm on the left armrest to the state in which the user puts his/her arm on the right armrest.

The transmission section 220 transmits the activity information acquired by the signal analysis section 210 to an external device, using one of a wired communication scheme, a wireless communication scheme, and an infrared communication scheme. In this case, the wired communication scheme may include USB communication, RJ-45 communication, and RS232 communication, and the wireless communication scheme may include Bluetooth communication, Zig-Bee communication, and mobile communication.

The display section 230, which includes a speaker and a monitor embedded in the seat, generates a character, an image, and a sound corresponding to the information acquired by the signal analysis section 210 and then outputs the character, the image, and the sound to the speaker and the monitor. Therefore, the user or another person may instantly recognize information on one or more of whether the user is seated or not, seating posture, and a change of the seating posture, in visual and auditory manners.

FIGS. 2A to 2D are diagrams illustrating installation examples of the variable resistance unit according to the embodiment of the present invention.

Referring to FIGS. 2A to 2D, the installation form of the variable resistance unit 100 according to the embodiment of the present invention may be changed in various manners so that activities within a range such as whether a user is seated or not, a seating posture, and a seating posture change may be measured with precision.

Figure 2A:
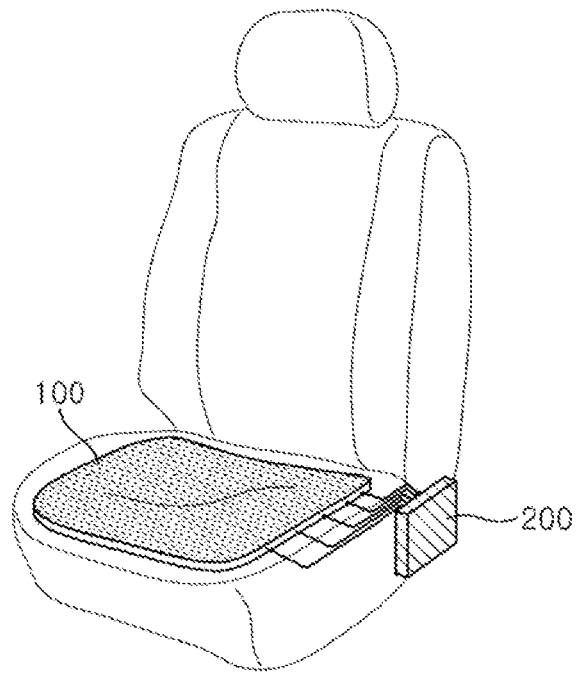
FIGS. 2A to 2D are diagrams illustrating installation examples of a variable resistance unit according to the embodiment of the present invention.
Figure 2B:
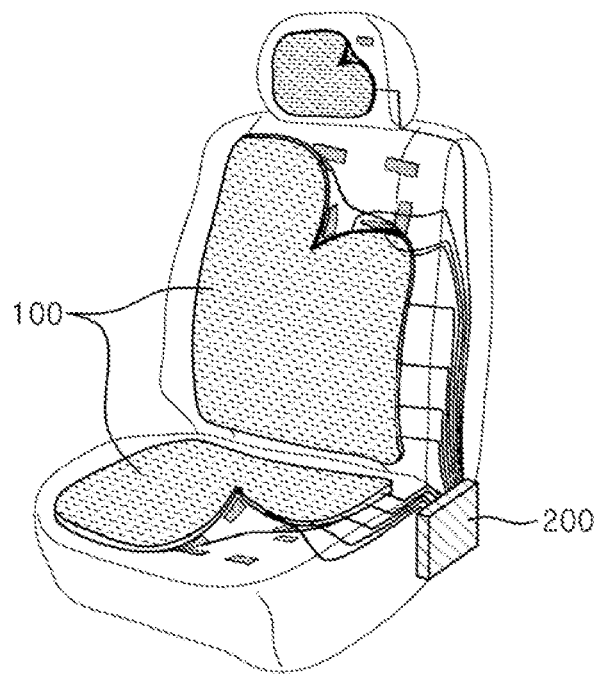
Figure 2C:
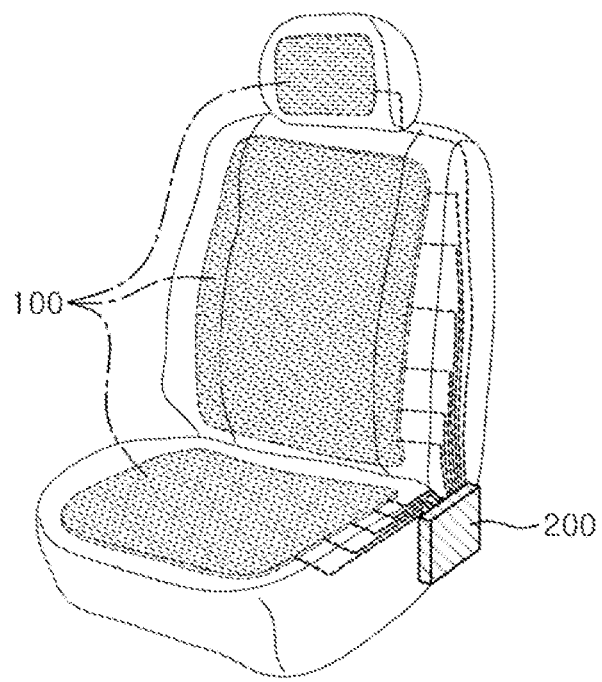

That is, the variable resistance unit 100 may be installed as a cushion type on a seat board as illustrated in FIG. 2A, installed as a patch type so as to be attached to and detached from the seat as illustrated in FIG. 2B, installed as an embedded type so as to be embedded in the seat as illustrated in FIG.

Figure 2D:
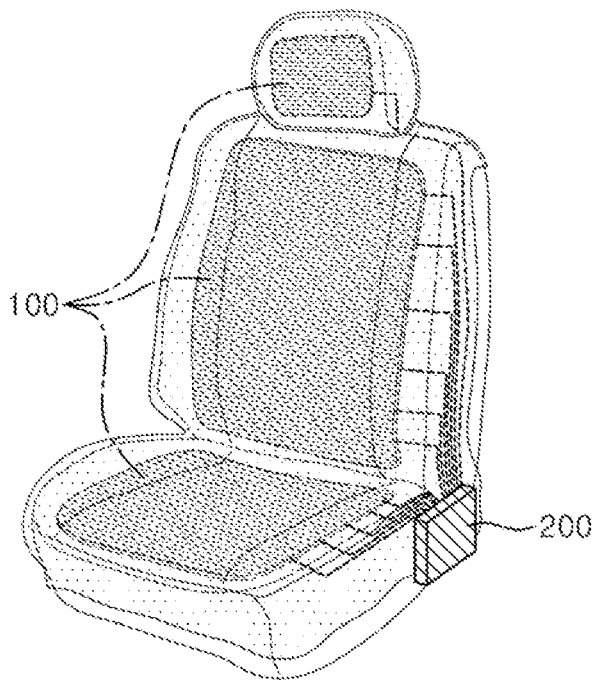

2C, or installed as a sheet type so as to cover the entire surface of the seat as illustrated in FIG. 2D.

The variable resistance unit 100 may be disposed in the seat board, the backrest, and the neck rest of the seat so as to precisely measure whether a user is seated or not, a seating posture, and a seating posture change. That is, the variable resistance unit 100 may be disposed at portions where the variation in the circumference of the seat is large depending on the weight of the user.

Furthermore, the plurality of conductive threads forming the variable resistance unit 100 may be disposed at even intervals from each other, in order to increase the precision of measurements.

Figure 4:
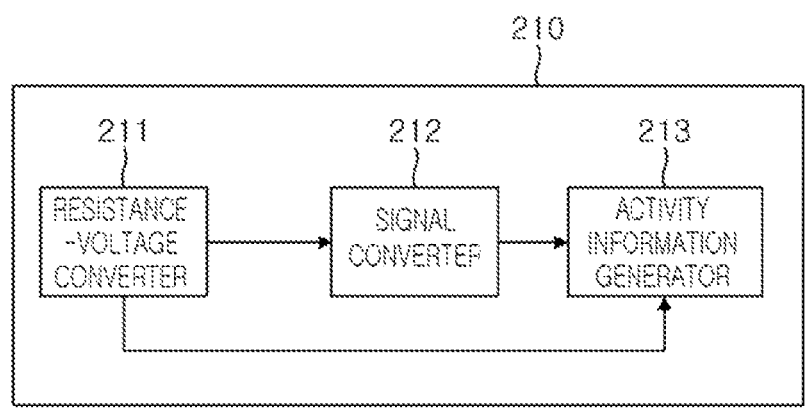
FIG. 4 is a detailed configuration diagram of a signal analysis section according to the embodiment of the present invention.

FIG. 4 is a detailed configuration diagram of the signal analysis section according to the embodiment of the present invention.

Referring to FIG. 4, the signal analysis section 210 includes a resistance-voltage converter 211, a signal converter 212, and an activity information generator 213.

The resistance-voltage converter 211 converts a plurality of resistance values generated by the plurality of conductive threads into voltage values, respectively. The resistance-voltage converter 211 includes one or more voltage division circuits. Each of the voltage division circuits includes a reference resistor and a variable resistor which are connected in series between a power supply voltage terminal and a ground terminal, and the variable resistor may include one or more conductive threads.

When a person is seated on the seat such that the outer circumferences of the seat board and the backrest of the seat are increased, the lengths of the conductive threads disposed in the seat board and the backrest of the seat are also increased. Accordingly, an increased resistance value is generated. Then, a voltage value corresponding to the increased resistance value is applied across the variable resistor implemented as the conductive threads. The voltage applied across the variable resistor may be measured to convert the length or resistance value of the conductive threads into the voltage value.

The signal converter 212, which includes a plurality of signal converters, analog-digital converts the voltage values outputted from the resistance-voltage converter 211 through the plurality of signal converters, and generates digitized voltage values.

Furthermore, the signal converter 212 may utilize the analog voltage values without the conversion by the signal converters, if necessary, and derive minimum activity information on whether the user is seated or not, through a simple method such as filtering.

The activity information generator 213 previously defines determination standards for whether the user is seated or not, seating posture, and a seating posture change, analyzes patterns of change in the digitized voltage values outputted from the signal converter 212 on the basis of the determination standards, and derives activity information on one or more of whether the user is seated or not, seating posture, and a seating posture change.

Furthermore, the activity information generator 213 may utilize the analog voltage values without the conversion by the signal converter, if necessary, and derive minimum activity information on whether the user is seated or not, through a simple method such as filtering.

Figure 5:
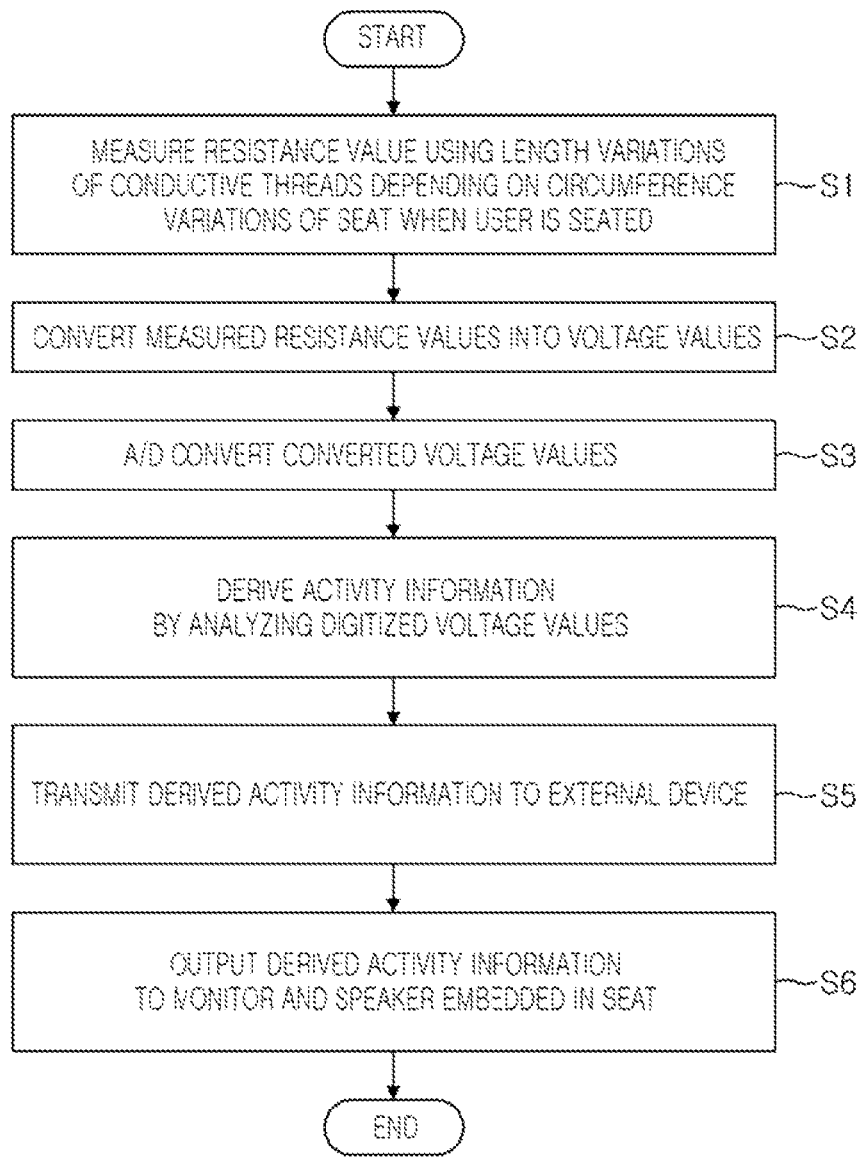
FIG. 5 is a flow chart showing a method for operating the seating sensing device embedded in a seat according to another embodiment of the present invention.

FIG. 5 is a flow chart showing a method for operating the seating sensing device embedded in a seat according to another embodiment of the present invention. For convenience of description, FIG. 5 describes only a case in which a user's seating is detected. The specific embodiment of the seating sensing device embedded in a seat according to the embodiment of the present invention has been already described above. Therefore, only the operational process thereof will be described briefly.

Referring to FIG. 5, resistance values are measured by using variations in the lengths of the conductive threads depending on variations in the outer circumference of a seat when a user is seated on the seat (S1).

The measured resistance values are converted into voltage values (S2), and the converted voltage values are A/D converted (S3).

The digitized voltage values are analyzed to confirm whether the outer circumference of the seat is rapidly varied or not. When it is confirmed that the outer circumference of the seat has been rapidly varied, activity information reporting that the user is seated on the seat is generated (S4).

The activity information reporting the user's seating is transmitted to an external device (S5).

When the user in the seat requests the activity information, a character, an image, or a sound is generated depending on the activity information and outputted to the monitor or the speaker attached on the seat.

Figure 6:
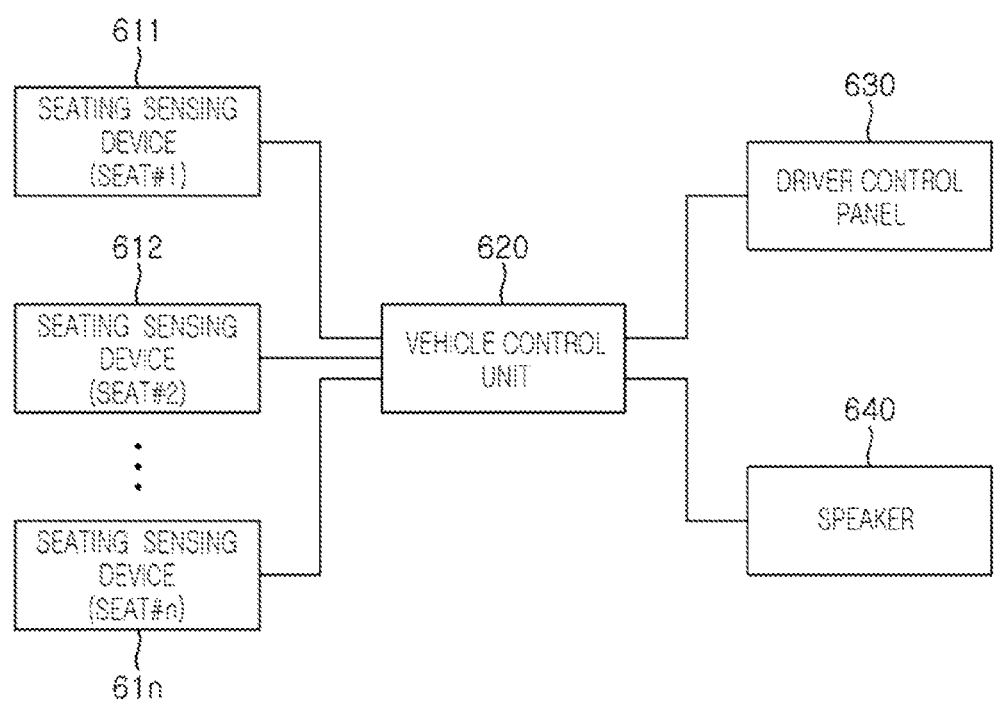
FIG. 6 is a diagram illustrating an example in which the seating sensing device embedded in a seat according to a case in which the embodiment of the present invention is applied to a vehicle such as a bus.

FIG. 6 is a diagram illustrating an example in which the seating sensing device embedded in a seat according to the embodiment of the present invention is applied to a vehicle such as a bus.

Referring to FIG. 6, a seating confirmation system according to another embodiment of the present invention includes a plurality of seating sensing devices 611 to 61n, a vehicle control unit 620, a driver control panel 630, and a speaker 640. The plurality of seating sensing devices 611 to 61n are configured in a manner such as that illustrated in FIG. 1, and installed in a plurality of passenger seats, respectively, in order to generate and provide user activity information. The vehicle control unit 620 communicates with the plurality of seating sensing devices 611 to 61n. The driver control panel 630 is installed adjacent to a driver's seat to communicate with the vehicle control unit 620. The speaker 640 broadcasts a preset announcement under the control of the vehicle control unit 620 or the driver control panel 630.

The plurality of seating sensing devices 611 to 61n are installed in the respective passenger seats to generate and output passenger activity information on one or more of whether a passenger is seated or not, a seating posture, and a seating posture change. Then, the vehicle control unit 620 collects information transmitted from the plurality of seating sensing devices 611 to 61n, and derives information related to the operation of the vehicle such that the derived information may be used in various manners.

For example, before the vehicle starts, the activity information provided from the respective seating sensing devices 611 to 61n may be analyzed to confirm whether passengers are seated on the respective seats or not. Furthermore, the activity information may be compared with seat reservation information provided from a vehicle operation management server to confirm seat occupation statistics or whether a specific seat is occupied or not. Then, the seat occupation statistics or whether or not a specific seat is occupied may be displayed on the driver control panel 630.

Furthermore, while the vehicle is operated, the seating postures of the respective passengers may be determined through the activity information provided from the respective seating sensing devices 611 to 61n. When a passenger having a seating posture which may disturb the operation of the vehicle or may seem to be risky is confirmed, this may be displayed on the driver control panel 630, and simultaneously, an announcement for inducing a correct seating posture may be broadcast through the speaker 640.

According to the embodiment of the present invention, the seating sensing device and method may easily and effectively derive activity information such as whether a user is seated or not, by using the conductive threads installed in the seat without a separate external device or mechanism.

Furthermore, continuous monitoring may be performed, and information related to a seating state may be instantly recognized by a seated user in visual and auditory manners.

Furthermore, the activity information acquired by the seating sensing device may be provided to an external device to collect and utilize information such as seat occupation statistics or whether a specific seat is occupied or not.

While the present invention has been shown and described in connection with the exemplary embodiments, it will be apparent to those skilled in the art that modifications and variations can be made without departing from the spirit and scope of the invention as defined by the appended claims.

What is claimed is:

1. A seating sensing device comprising:
   a variable resistance unit configured to generate resistance values corresponding to a length in a seat region of a seat, the variable resistance unit including a plurality of conductive threads installed in the seat, the seat comprising a plurality of seat regions; and
   a signal analysis unit configured to analyze variable quantities corresponding to the resistance values to acquire activity information indicating one or more of whether a user is seated or not, a seating posture, and a seating posture change, the signal analysis unit comprising a resistance-voltage converter configured to convert the resistance values into corresponding voltage values and an activity information generator configured to analyze a pattern in the voltage values to acquire the activity information,
   wherein the activity information generator is configured to determine patterns of change in the seat regions in which the voltage values are increased to be greater than before, to confirm whether the seating posture of the user is changed or not, to generate and output the activity information indicating that the seating posture has been changed.

2. The seating sensing device of claim 1, wherein each of the conductive threads comprises:
   a electroconductive fiber configured to generate a resistance value corresponding to a length thereof; and
   an elastic thread having elasticity.

3. The seating sensing device of claim 2, wherein each of the conductive threads comprises the electroconductive fiber and the elastic thread are twisted around each other.

4. The seating sensing device of claim 2, wherein the plurality of conductive threads are disposed at even intervals from each other.

5. The seating sensing device of claim 1, wherein the variable resistance unit is installed as a cushion type on a seat board, installed as a patch type so as to be attached to or detached from the seat surface, installed as an embedded type so as to be embedded in the seat, or installed as a sheet type so as to cover the entire surface of the seat.

6. The seating sensing device of claim 1, wherein when a voltage value having a larger variable quantity than a seating detection reference value exists, the activity information generator generates and outputs the activity information indicating that the user is seated.

7. The seating sensing device of claim 1, wherein the activity information generator determines the seat regions in which the voltage values are increased, derives the seating posture of the user, and generates and outputs activity information indicating the derived seating posture.

8. The seating sensing device of claim 1, wherein the resistance-voltage converter comprises one or more voltage division circuits having one or more of the plurality of conductive threads as variable resistors and dividing voltages depending on the resistance values of the variable resistors.

9. The seating sensing device of claim 1, wherein the signal analysis unit further comprises a signal converter configured perform analog-digital conversion on the voltage values to convert the voltage values into corresponding digitized voltage values and to provide the digitized voltage values to the activity information generator.

10. The seating sensing device of claim 7, further comprising a display unit configured to generate any of a character, an image, and a sound corresponding to the activity information and to output the generated character, image, and sound to any of a monitor and a speaker which are embedded therein.

11. The seating sensing device of claim 1, further comprising a transmission unit configured to provide the activity information to an external device.

12. The seating sensing device of claim 1, wherein the length in the seat region of the seat comprises a circumference of the seat region.

13. The seating sensing device of claim 11, wherein the external device comprises any of a display device and an audio device.

14. A seating sensing method comprising:
   generating resistance values corresponding to a length in a seat region of a seat through a plurality of conductive threads installed in the seat, the seat comprising a plurality of seat regions;
   converting the resistance values into voltage values, respectively;
   performing analog-digital conversion on the voltage values to convert the voltage values into digitized voltage values, respectively; and
   analyzing the digitized voltage values to acquire activity information indicating one or more of whether a user is seated or not, a seating posture, and a seating posture change,
   wherein, the step of analyzing the digitized voltage values comprises:
   when the digitized voltage values indicate there is a seating posture change, determining patterns of change in the seat regions in which the voltage values are increased to be greater than before, confirming whether the seating posture of the user is changed or not, generating and outputting the activity information indicating that seating posture has been changed, and
   wherein the length in the seat region of the seat comprises a circumference of the seat region.

15. The seating sensing method of claim 14, further comprising transmitting the activity information to an external device.

16. The seating sensing method of claim 15, wherein the external device collects seat occupation statistics.

17. The seating sensing method of claim 15, further comprising continuously monitoring the activity information of the seated user.

18. The seating sensing method of claim 15, further comprising reporting the activity information of the seated user using any of a display device and an audio device.

* * * * *